United States Patent
Simek et al.

(10) Patent No.: US 10,185,549 B2
(45) Date of Patent: Jan. 22, 2019

(54) UPDATING LIVE SYSTEM WITH STATIC CHANGES

(71) Applicant: MICROSOFT TECHNOLOGY LICENSING, LLC, Redmond, WA (US)

(72) Inventors: Patrick Simek, Redmond, WA (US); Gaia Carini, Redmond, WA (US); Min Shao, Bellevue, WA (US); Randy Thomson, Redmond, WA (US); Prashant Gaurav, Redmond, WA (US); Ankur Jauhari, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 15/194,583

(22) Filed: Jun. 28, 2016

(65) Prior Publication Data
US 2017/0371639 A1 Dec. 28, 2017

(51) Int. Cl.
G06F 9/445 (2018.01)
G06F 8/65 (2018.01)
H04L 29/08 (2006.01)
H04L 29/06 (2006.01)

(52) U.S. Cl.
CPC ............... *G06F 8/65* (2013.01); *H04L 67/02* (2013.01); *H04L 67/04* (2013.01); *H04L 67/10* (2013.01); *H04L 67/20* (2013.01); *H04L 67/22* (2013.01); *H04L 67/34* (2013.01); *H04L 67/42* (2013.01)

(58) Field of Classification Search
CPC ................................. G06F 8/65–8/66
See application file for complete search history.

(56) References Cited

U.S. PATENT DOCUMENTS

| | | | |
|---|---|---|---|
| 8,880,704 B2 | 11/2014 | Kruglick | |
| 9,043,370 B2 | 5/2015 | Hopmann et al. | |
| 9,239,690 B2 | 1/2016 | Backa | |
| 2004/0024853 A1* | 2/2004 | Cates | G06F 8/67 709/223 |

(Continued)

OTHER PUBLICATIONS

Neamtiu, Iulian, and Tudor Dumitraş. "Cloud software upgrades: Challenges and opportunities." Maintenance and Evolution of Service-Oriented and Cloud-Based Systems (MESOCA), 2011 International Workshop on the. IEEE. (Year: 2011).*

(Continued)

*Primary Examiner* — Chameli Das
*Assistant Examiner* — Joanne G Macasiano
(74) *Attorney, Agent, or Firm* — Michael Best & Friedrich LLP

(57) ABSTRACT

Technologies are described for updating a live system with static changes. According to some examples, changes such as installing and/or removing features may be applied to a cloud based service in live environment without disrupting the service. New software may be patched and installed on an upgraded machine (i.e., server). New features, diagnostics, and language packs may be added. Existing features and certificates may be removed. To accomplish these, new software to be installed and existing software to be removed may be detected. Removal and additions may be performed without preparation and activation of replacement farms.

14 Claims, 8 Drawing Sheets

(56) References Cited

U.S. PATENT DOCUMENTS

| | | | | |
|---|---|---|---|---|
| 2004/0243931 | A1* | 12/2004 | Stevens | G06F 8/38 |
| | | | | 715/236 |
| 2006/0106585 | A1 | 5/2006 | Brown et al. | |
| 2007/0261049 | A1* | 11/2007 | Bankston | G06F 8/65 |
| | | | | 717/170 |
| 2009/0112570 | A1* | 4/2009 | Williams | G06F 8/20 |
| | | | | 703/23 |
| 2012/0059922 | A1 | 3/2012 | Jason et al. | |
| 2012/0101998 | A1* | 4/2012 | Cahill | G06F 17/3089 |
| | | | | 707/654 |
| 2014/0068594 | A1* | 3/2014 | Young | G06F 21/572 |
| | | | | 717/172 |
| 2014/0241203 | A1 | 8/2014 | Elson | |
| 2017/0371650 | A1* | 12/2017 | Li | G06F 8/71 |

OTHER PUBLICATIONS

Bhattacharya, Pamela, and Iulian Neamtiu. "Dynamic updates for web and cloud applications." Proceedings of the 2010 Workshop on Analysis and Programming Languages for Web Applications and Cloud Applications. ACM. (Year: 2010).*

Best Practices for Data Center Fiber-Optic Cabling Systems—Cabling Installation and Maintenance Apr. 14, 2016; Keith Foord, Product Manager, Fiber Optics, Greenlee Communications http://www.cablinginstall.com/webcasts/2016/04/best-practices-for-data-center-fiber-optic-cabling-systems.html.

* cited by examiner

UPDATING LIVE SYSTEM WITH STATIC CHANGES

BACKGROUND

Cloud based services leverage continuous integration and deployment, meaning that code changes are being made on a constant basis and those changes are deployed from a developer's computer out to production at a rapid cadence. Some cloud based services are set up in farms. That is, a dedicated number of servers perform tasks associated with providing the cloud based service. When upgrades or other changes are made to a cloud based service that is serving thousands of clients, the servers cannot be all shut down, software modified, and all servers turned back on again.

Some services may support a swing in order to perform an upgrade. In other words, a new server farm may need to be created with all the data needing to be migrated over. For patching, each sever may need to be updated individually with custom orchestration to avoid downtime. Thus, some customers may avoid this complex process by skipping upgrades and patching as much as possible, which in return may result in users not getting the latest features. Computing only upgrade is a swing technology to roll out new services. The hardware cost computing only upgrade may be relatively high—a hardware buffer of identical size may need to exist before an upgrade can take place. For example, about 25% of the machines may have to be reserved for such an upgrade buffer. Another challenge may be meeting guaranteed downtime requirements for tenants.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to updating a live system with static changes. In some examples, server level upgradability may be confirmed by checking one or more properties indicating whether a server farm hosting the cloud based service can upgrade and whether the server final is backward compatible. Next, a configuration database associated with the cloud based service may be upgraded. A status of configuration database objects may be set to 'Upgrading' to notify other components of the cloud based service such that no write operation is allowed on the configuration database until the upgrade is completed. Server level upgradable objects and global upgradable objects may be upgraded by constructing an object tree representing an upgrade hierarchy and upgrading each object according to the upgrade hierarchy. Upgraders to the configuration database may be completed rapidly and not allowed to break backwards compatibility.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
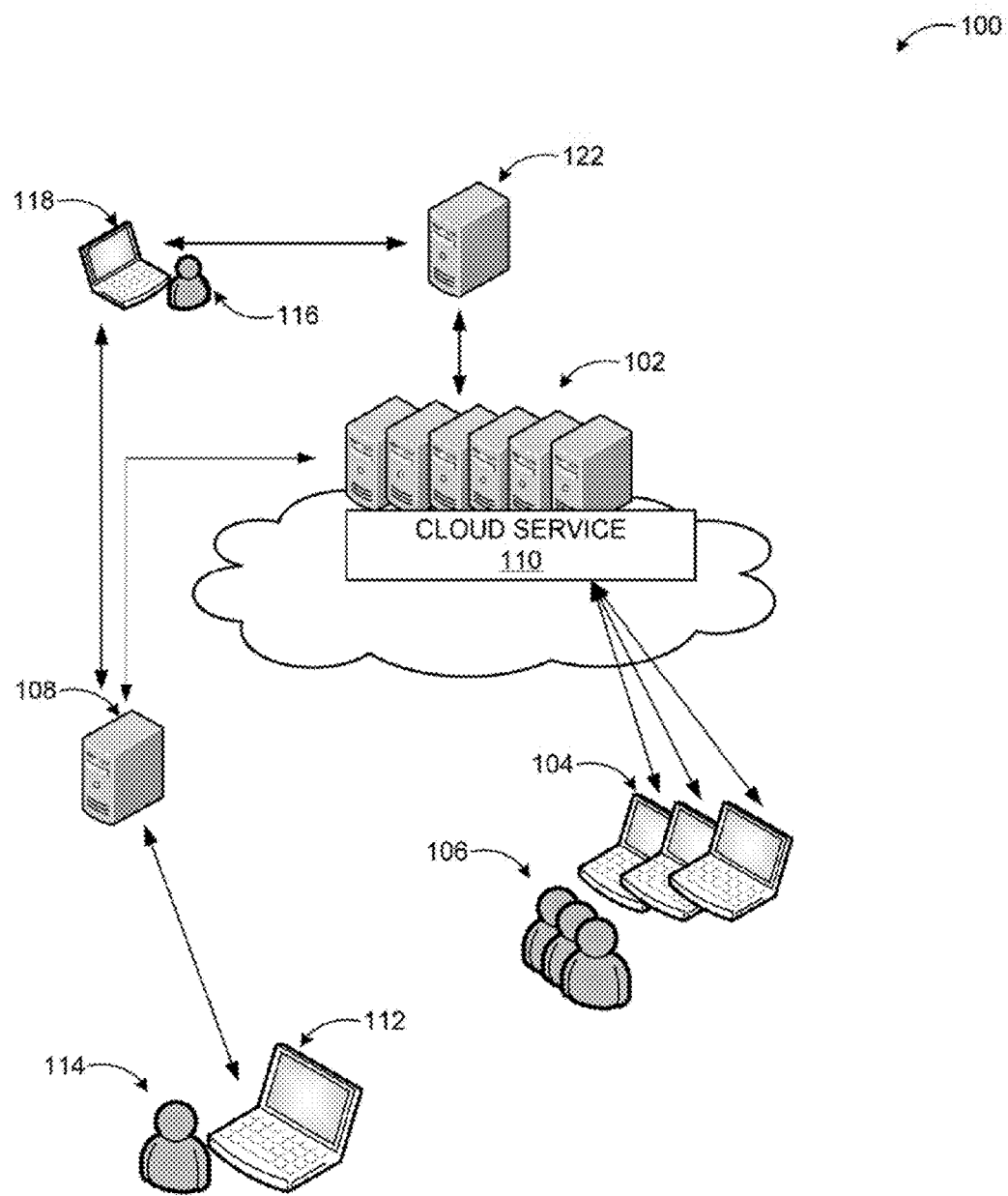
FIG. 1 is a conceptual display diagram illustrating an example computing environment for a hosted service that may be subject to upgrades and patches.

As briefly described above, embodiments are directed to updating a live system with static changes. According to some examples, changes such as installing and/or removing features may be applied to a cloud based service in live environment without disrupting the service. New software may be patched and installed on an upgraded machine (i.e., server). New features, diagnostics, and language packs may be added. Existing features and certificates may be removed. To accomplish these, new software to be installed and existing software to be removed may be detected. Removal and additions may be performed without preparation and activation of replacement farms.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with a application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components for updating a live system with static changes. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and one or more processors that includes a server, a desktop computer, a laptop computer, a tablet computer, a smart phone, a vehicle mount computer, or a wearable computer. A memory may be a removable or non-removable component of a computing device configured to store one or more instructions be executed by one or more processors. A processor may be a component of a computing device coupled to a memory and configured to execute programs in conjunction with instructions stored by the memory. Actions or operations described herein may be executed on a single processor, on multiple processors (in a single machine or distributed over multiple machines), or on one or more cores of a multi-core processor. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that allow the application or service to interact or communicate with one or more other applications and services managed by separate entities.

The technical advantages of updating a live system with static changes may include, among others, increased efficiency and reliability in hosted service deployments, updates, upgrades, and performance, reduced processing and network bandwidth usage (reduced number of updates and upgrades), and improved user experience by avoiding farm replacement related challenges. In comparison, static changes may have to be side-by-side, i.e., a folder for current version and another folder for next version may be needed.

Embodiments address a need that arises from very large scale of operations created by networked computing and cloud based services that cannot be managed by humans. The actions/operations described herein are not a mere use of a computer, but address results of a system that is a direct consequence of software used as a service such as collaboration services offered in conjunction with a hosted collaboration service that may be updated with static changes.

FIG. 1 is a conceptual display diagram illustrating an example computing environment for a hosted service that may be subject to upgrades and patches.

As shown in a diagram 100, servers 102 may execute a cloud-based application or service 110 that may provide a variety of functionalities to users 106 through client devices (and/or applications) 104. For example, the cloud-based application or service 110 may be a collaboration service that includes a number of applications directed to collaboration functionality, etc. The cloud-based application or service 110 may be developed (code written) by one or more developers 114 using a code development system that may be executed on a server 108 and accessed through a client device or application 112. As changes are made to the cloud-based application or service 110 at regular intervals or on-demand for updates, upgrades, or problem fixes, those changes may also be provided by the one or more developers 114.

In some cases, a separate system may be set up to manage updates to the cloud-based application or service 110. For example, an update service executed on a server 122 may manage workloads on servers, set aside new servers with updated (upgraded or patched programs), and bring those servers online as servers with existing programs are taken offline. In such as scenario, a user 116 (e.g., an administrator) may have to detect programs/features that need to be updated, and manually coordinate the update process through an application/service 118. Use of dedicated new machines (i.e., servers or server dorms for updates may not only increase hardware and operational costs dramatically, but also add to complexity of managing a cloud based service in an environment with a large number of end users and high frequency of updates.

Users 106 may access the cloud-based application or service 110 through their respective client devices or applications 104 over one or more networks. The networks may provide wired or wireless communications between nodes, such as the client devices 104 or the servers 102. In some embodiments, components of the cloud-based application or service 110 may also be locally executed on a user's computing device. Similarly, developers 114 and/or developers 116 may access respective code writing or code monitoring services through networked communications between, client devices/applications and servers. A user experience may be provided to the users 106 and the developers 114, 116 as a visual display through which the users 106 and the developers 114, 116 may interact with the respective applications/services visually. The interactions may include a touch input, a gesture input, a voice command, eye tracking, a gyroscopic input, a pen input, mouse input, and/or a keyboards input, among others.

The computing devices used to access respective applications services may each include a display device, such as a touch enabled display component, and a monitor, among others, to provide access to the respective application/service for the users and developers through a web browser (thin client) or a local client application (thick client). The computing devices may include a desktop computer, a laptop computer, a tablet, a handheld device, a vehicle mount computer, an embedded computer system, a smart phone, and a wearable computer, among other computing devices, for example.

While the example system in FIG. 1 has been described with specific components including the servers 102, 122, and 108, and respective client devices/applications, embodiments are not limited to these components or system configurations and can be implemented with other system configuration employing fewer or additional components.

Figure 2:
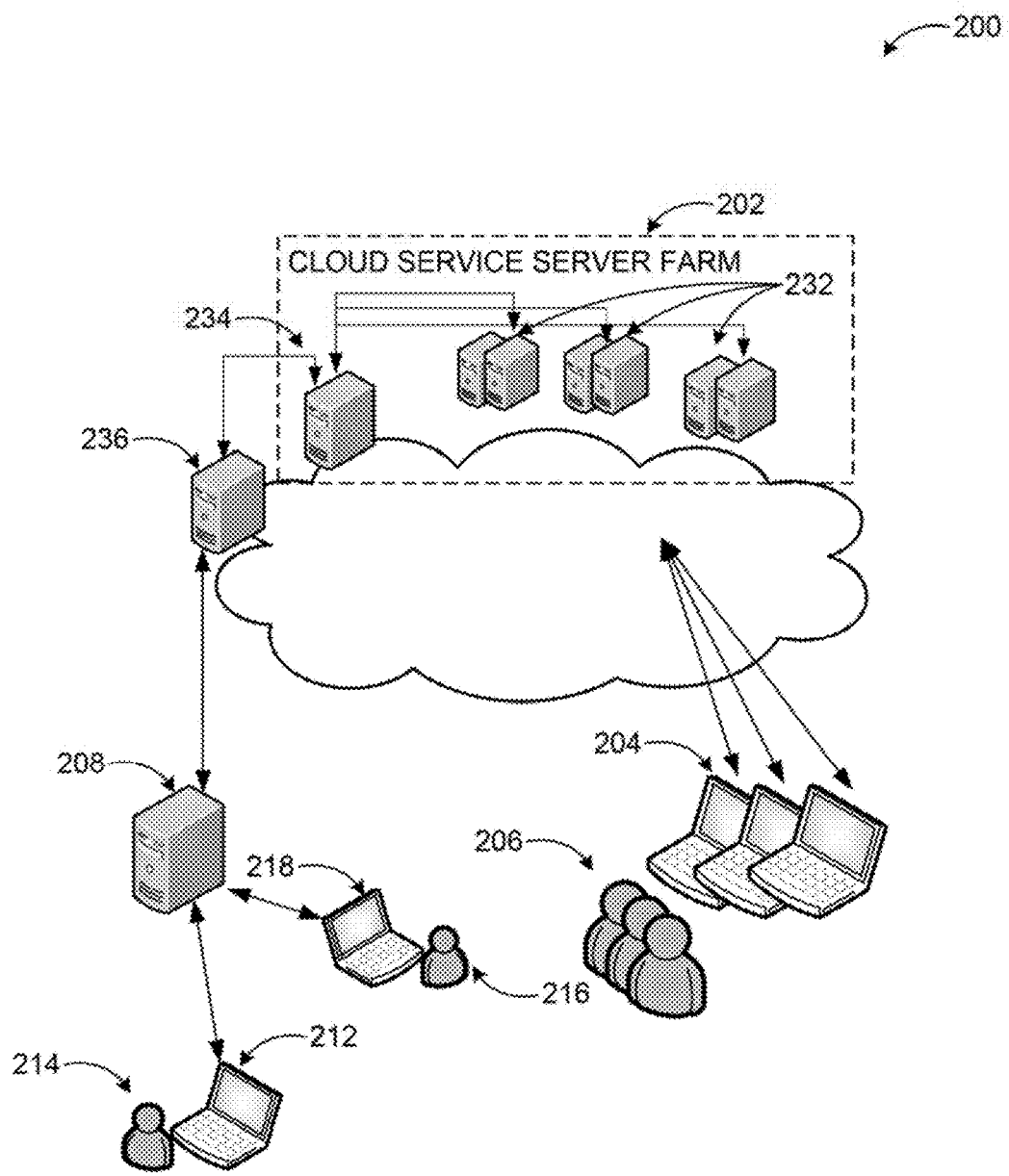
FIG. 2 is a conceptual display diagram illustrating an example computing environment for updating a live system with static changes, according to embodiments.

FIG. 2 is a conceptual display diagram illustrating an example computing environment for updating a live system with static changes, according to embodiments.

As shown in diagram 200, a cloud-based application or service may be executed on servers (or server groups) 232 that are part of server farm 202 and provide a variety of functionality to users 206 through client devices (and/or applications) 204. Server farm 202 may include a number of general purpose and a number of special purpose servers. For example, some servers may execrate applications and modules within the cloud-based service while other servers may perform specific tasks such as storing specific data, managing security, facilitating communications, and so on. In a practical implementation of a large scale service, server farm 202 may include thousands of servers.

Developers 214 and 216 are examples of a number of developers who may work on developing and updating source code associated with the cloud-based service. The developers 214 and 216 may access a code development service executed on a server 208 through thick or thin client applications executed on client devices 212 and 218.

In a system according to embodiments, an update management server 236 may collect information associated with the cloud based service and its application deployed across the servers of the server farm 202. The collected information may be used to detect features and components to be removed and/or added. New features, diagnostics, certificates, language packs, etc. may then be installed and existing ones removed without disrupting the service to the users 206 and employing new server farms or dedicated update machines.

Figure 3:
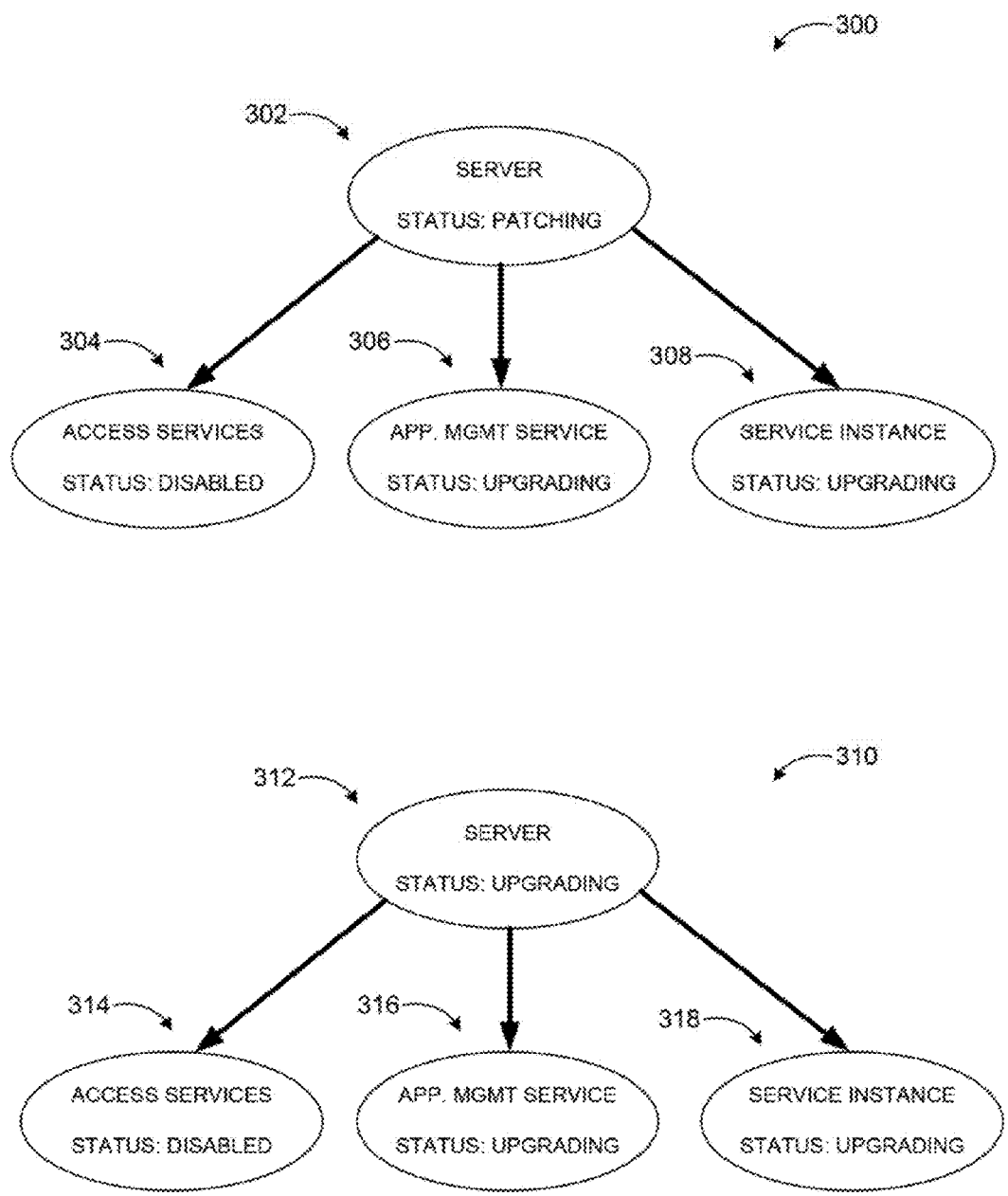
FIG. 3 is a conceptual diagram illustrating example objects, according to embodiments.

FIG. 3 is a conceptual diagram illustrating example objects, according to embodiments.

In some embodiments, a partitioned farm configuration may be employed and the server farm may be component to make updates always online. An update according to embodiments may go from machine to machine and upgraders may be executed component by component. Changes may thus be made globally (always online) and not make the farm unresponsive. The system may detect new software to install, software to be removed, new register keys to update, and new language packs and install them accordingly. Global properties may also be updated automatically by the update system.

In an example collaboration service implementation collaboration server objects may be patched per server—before upgrade is executed in an online fashion. VM actions may be integrated into a similar collaboration service upgrade infrastructure. Other collaboration service objects may be upgraded per server and a configuration database may be made online upgradable.

For collaboration database objects, the status may be set to 'Upgrading' which may inform a collaboration service timer service, front ends, etc. know that the database is being upgraded so that write operations are not allowed (unless the current process is a collaboration service upgrade process) on those databases until they have been fully upgraded. Example status values may include 'Online', 'Disabled', 'Offline', 'Unprovisioning', 'Provisioning', and 'Upgrading'.

This infrastructure may be applied to the collaboration service server and collaboration service instance objects, and other feature areas, such as a collaboration service instance load balancer may honor these states. Further, to help distinguish between patching and upgrading a 'Patching' status may be employed.

Once the collaboration service server/collaboration service instance status is updated, load balancers may automatically detect the change and work accordingly. A callous may be used for third party load balancers to integrate and be part of patching and upgrade. Example load balancers that may be updated may include collaboration service instance load balancer, access load balancer, project load balancer, circuit breakers, edge load balancers, etc.

As shown in diagram 300, the status property in the server object may be set to Patching (302) resulting in the status of the access services status being set to Disabled (304) and the status of application management service status (306) and service instance status (308) being set to Upgrading.

Diagram 310 shows, the scenario, where the status property in the server object is set to Upgrading (312) resulting in the status of the access services status again being set to Disabled (314) and the status of application management service status (316) and service instance status (318) again being set to Upgrading.

Figure 4:
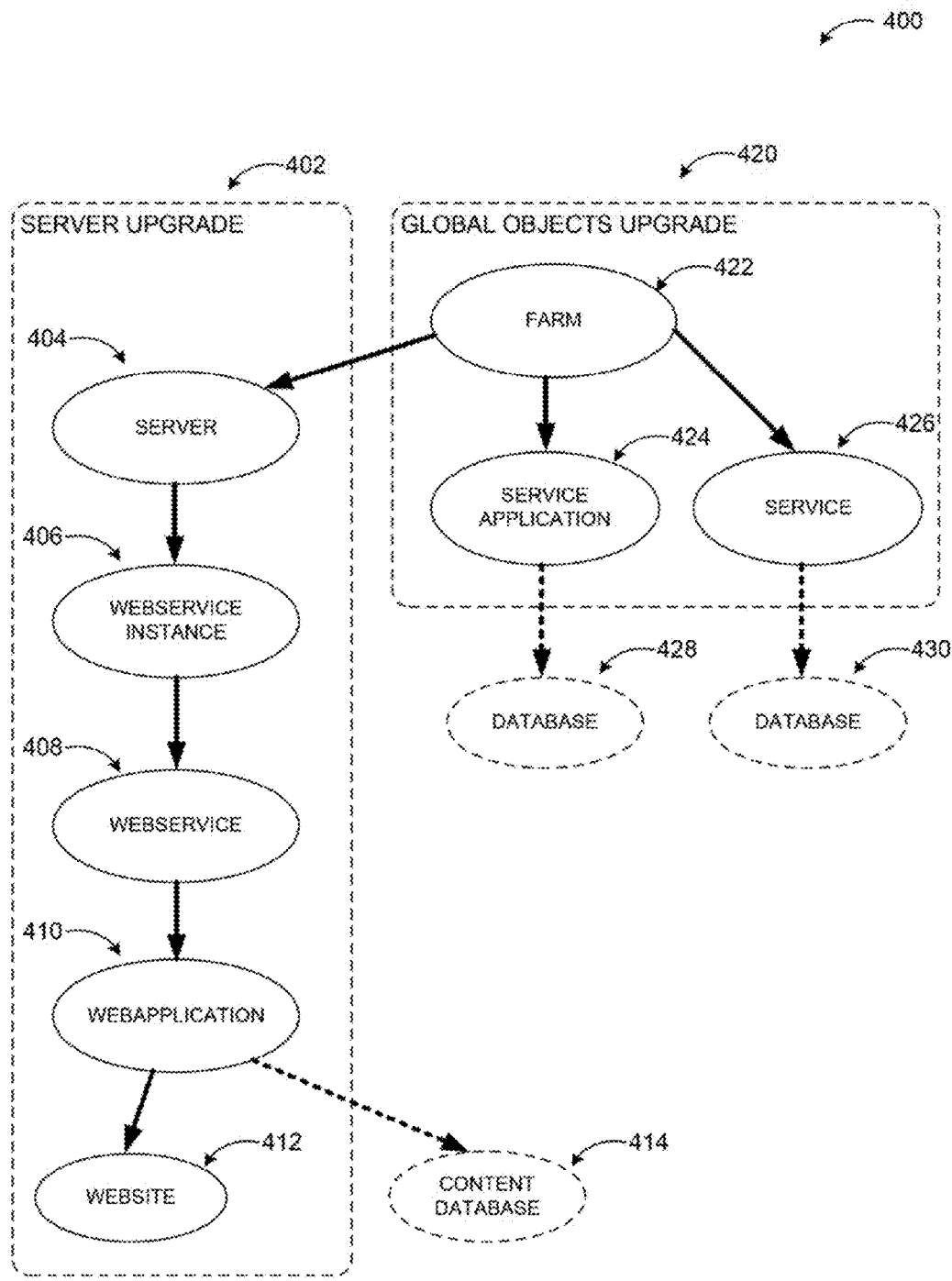
FIG. 4 is a display diagram illustrating a hierarchical structure of objects in an example service that is updated with static changes, according to embodiments.

FIG. 4 is a display diagram illustrating a hierarchical structure of objects in an example service that is updated with static changes, according to embodiments.

In some example embodiments, a service upgrade process may include four stages. In a pre-upgrade stage machine level upgradability tests may be performed. Properties indicating whether a server farm can upgrade and whether the server farm is backward compatible may be checked (value 'true'). In a configure store upgrade stage, the configuration database may be upgraded. Configuration database may be a component in a collaboration service that does not take part in the server farm upgrade. Thus, configuration database may be upgraded at bootstrap stage and not be part of the hierarchy thereafter constructed.

The phases of configuration database upgrade may include a schema upgrade phase, where the database schemas are upgraded for tables and views, a stored procedure upgrade phase, where the stored procedures are upgraded, and a data upgrade phase, where the data in the configuration database is upgraded.

In the service upgrade, orchestration module (also referred to as update management service/application herein) may connect to a machine. A machines (server) object may be marked as 'Upgrading' so no requests are sent to it. A corresponding change may be made in the load balancers where a request is not routed to a machine that is patching. This may prevent requests from coming to machines internally through load balancers while those machines are being patched and fail.

The service upgrade stage may take care of the server farm that is under upgrade. This stage may upgrade two types of objects: Global upgradable objects of (420) and per server upgradable objects (402). The upgrade framework may construct the object tree, a.k.a upgrade hierarchy. Calls such as CanUpgrade, NeedsUpgrade and IsBackwordCompatible may be used on upgradable objects in the tree. In the server upgrade portion, the framework may only upgrade local server. Additional granularity may be provided in an Upgrade-Farm cmdlet that initiates the upgrade to take individual object upgrades. The increase granularity may help in providing isolation to the entire system, in case upgrade is needed only for a single object.

As shown in diagram 400, at the machine level, (server upgrade 402) objects scoped to a specific server such as server object 404, webservice instance object 406, webservice object 408, webapplication object 410, and website object 412 in the object tree may be upgraded. Upgrade to content database 414 may be skipped for another upgrade stage. In the global objects upgrade phase 420, farm object 422, service application object 424 and service object 426 may be upgraded also affecting corresponding database objects 428 and 430. These objects may be upgraded on the first server.

Figure 5:
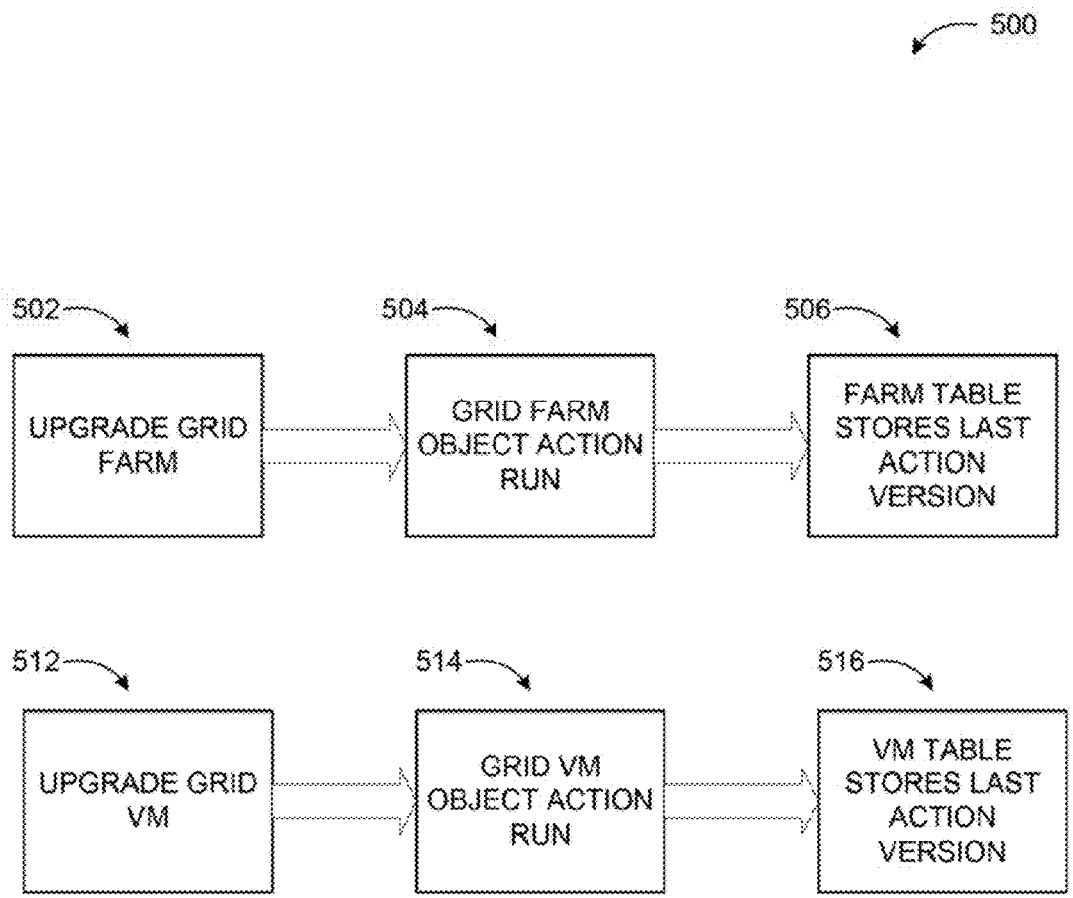
FIG. 5 is a display diagram illustrating example upgrade action flow for VMs and farms in a system according to embodiments.

FIG. 5 is a display diagram 500 illustrating example upgrade action flow for VMs and farms in a system according to embodiments.

The fourth stage of upgrade may be a post-upgrade stage, where all virtual machines (VMs) may be scanned to ensure they have been upgraded. Two grid objects may be used in the post-upgrade stage: a GridVM object (512) and a GridFarm object (502). Each object may have an action sequence similar to the farm object and database object. In some examples, a Start-GridVMInPlaceUpgrade cmdlet may execute VM related upgrade actions. In executing these cmdlets, the latest upgrade actions may be run. A property on the GridVM object and the GridFarm object may indicate which action the upgrades are run into (VM table 516 and Farm table 506). During a subsequent upgrade, these actions may be picked up ahead of the ones already run. The actions may be run in an online fashion and not affect the service availability to live customers. In other examples, VM upgrade actions may be run (514) and then Farm upgrade actions may be run (504).

The objects in diagram 500 are an example implementation for illustrative purposes. Embodiments may be implemented in other configurations and scenarios as well. For example, instead of a GridFarm/GridVM, a more generic version may be implemented as a system with a Farm (e.g., a collaboration service Farm) with many machines (collaboration service servers). These may have each have their upgraders. There may also be an orchestration component over the level of objects. The objects, GridFarm and GridVM may be used to distinguish between collaboration service and an entity in the underlying system. For example, GridFarm may be called GlobalSystemUpgradeOrchestrator and GridVM may be called GlobalMachineObject.

Figure 6:
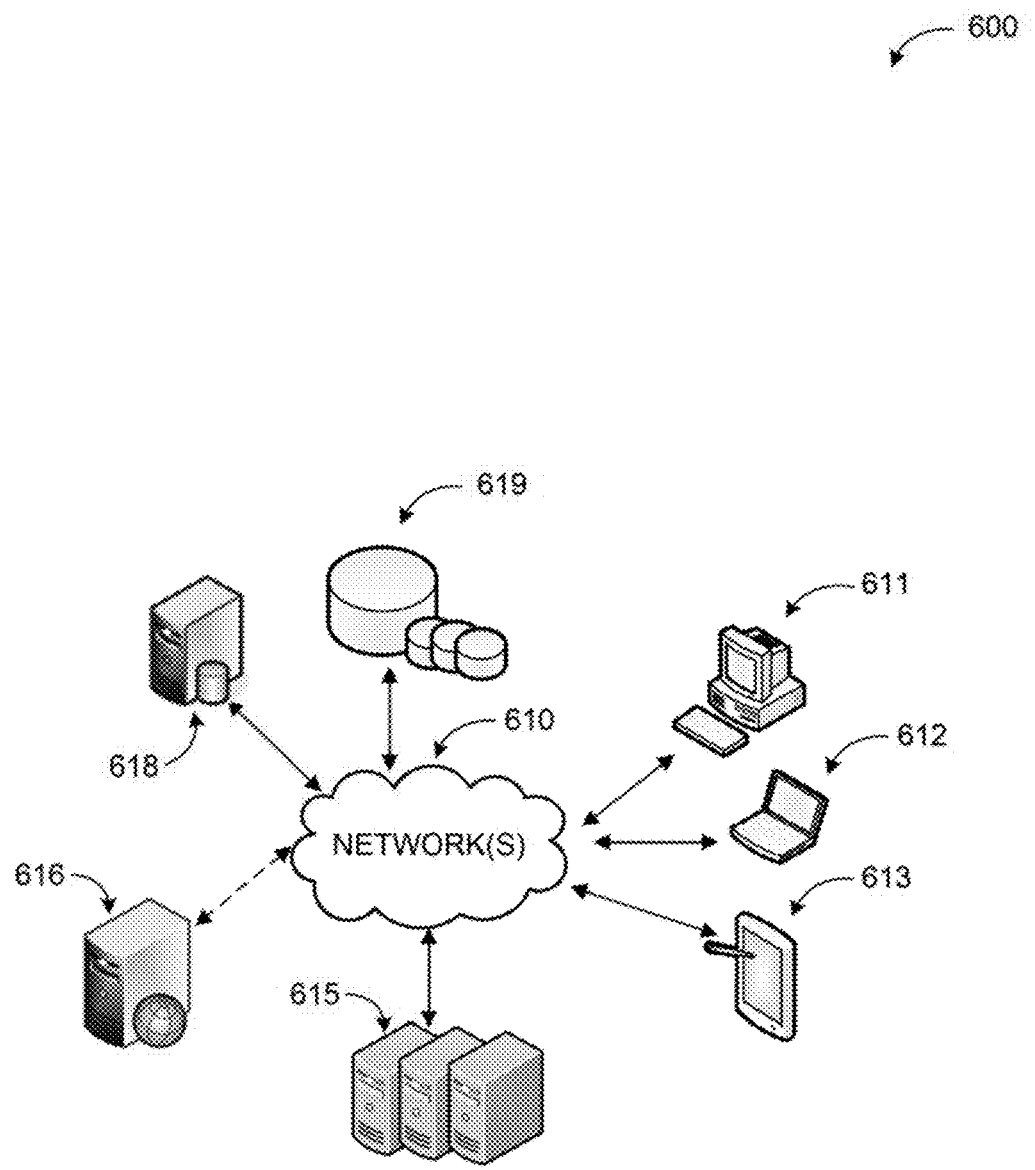
FIG. 6 is a simplified networked environment, where a system according to embodiments may be implemented.

FIG. 6 is a simplified networked environment, where a system according to embodiments may be implemented.

As shown in a diagram 600, a hosted service such as a cloud-based service may be implemented in a networked environment over one or more networks, such as a network 610. Participants may access service or one or more applications within the service through locally installed or thin (e.g., browser) client applications executed on a variety of computing devices 611-613, such as a smart phone 613, a mobile computer 612, or a desktop computer 611 ('client devices'). The service may interact with users through locally installed or thin (e.g., browser) client applications executed on a variety of computing devices. Changes such as installing and/or removing features, may be applied to a cloud based service in live environment without disrupting the service. New software may be patched and installed on an upgraded machine (i.e., server).

A service, as discussed herein, may be implemented via software executed over servers 615. The servers 615 may include one or more web servers 616, where at least one of the one or more web servers 616 may be configured to provide access to the service through web communications. The service may store service data associated with objects and update status in a data store 619 directly or through a database server 618. With respect to a dynamic topology, when a new VM is about to be activated, it may process up to a point (installing base code) and wait to upgrade the new VM until the full IPU is finished in the IPU process. The VM may then perform a self-imposed upgrade before joining the farm.

A computing device may communicate with the server over a network 610. The network 610 may comprise any topology of servers, clients, Internet service providers, and communication media. A system according to embodiments may have a static or dynamic topology. The network 610 may include multiple secure networks, such as an enterprise network, an unsecure network, or the Internet. The unsecure network may include a wireless open network. The network 610 may also coordinate communication over other networks, such as Public Switched Telephone Network (PSTN) or cellular networks. Furthermore, the network 610 may include multiple short-range wireless networks, such as Bluetooth, or similar ones. The network 610 may provide communication between the nodes described herein. By way of example, and not limitation, the network 610 may include wireless media. The wireless media may include, among others, acoustic media, RF media, infrared media, and other wireless media.

Many other configurations of computing devices, applications, data sources, and data distribution systems may be employed for updating a live system with static changes. Furthermore, the networked environments discussed in FIG. 6 are for illustration purposes only. Embodiments are not limited to the example applications, modules, or processes.

Figure 7:
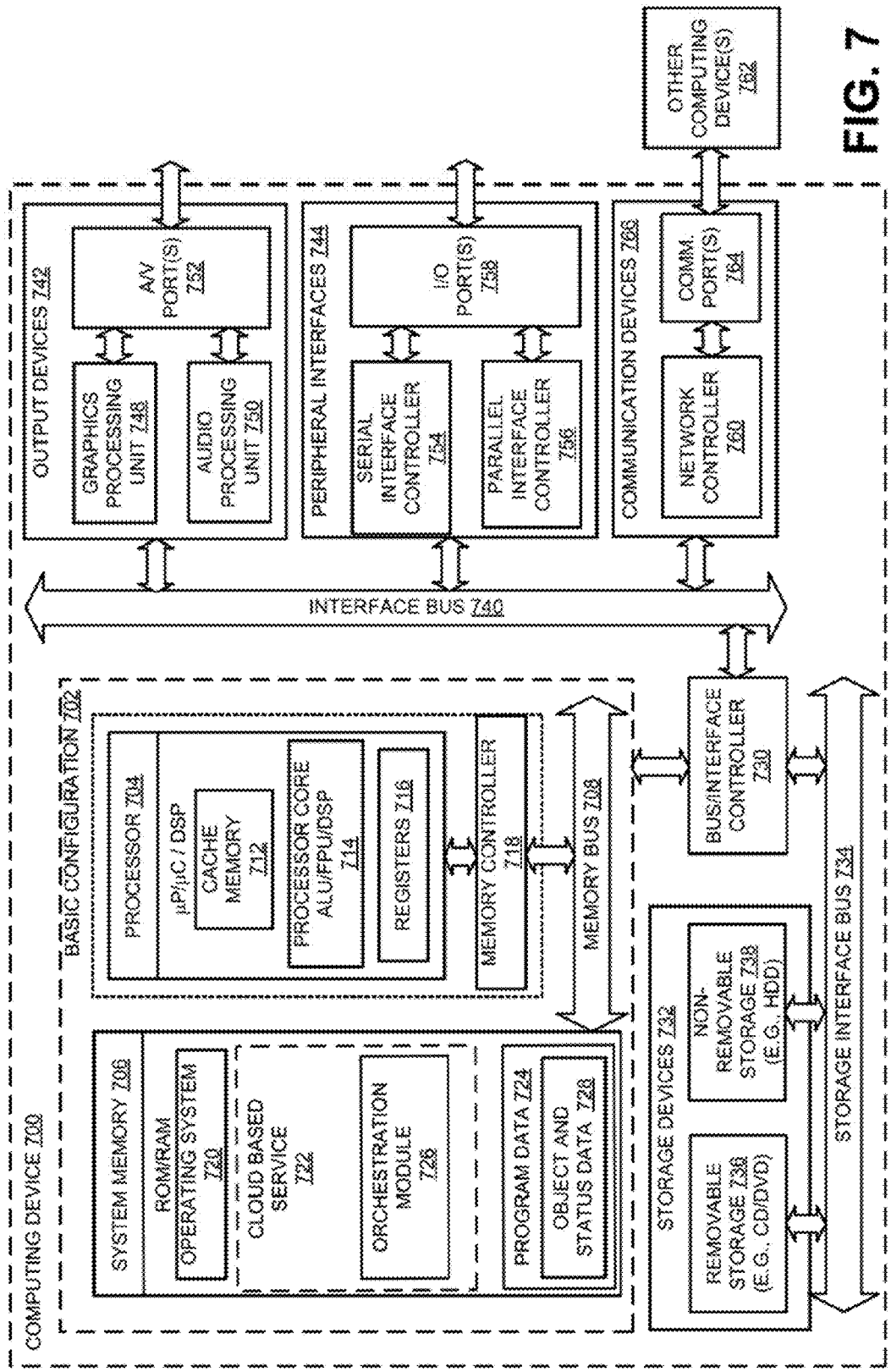
FIG. 7 is a block diagram of an example computing device, which may be used for updating a live system with static changes, according to embodiments.

FIG. 7 is a block diagram of an example computing device, which may be used for updating a live system with static changes, according to embodiments.

For example, a computing device 700 may be used as a server, desktop computer, portable computer, smart phone, special purpose computer, or similar device. In an example basic configuration 702, the computing device 700 may include one or more processors 704 and a system memory 706. A memory bus 705 may be used for communication between the processor 704 and the system memory 706. The example basic configuration 702 may be illustrated in FIG. 7 by those components within the inner dashed line.

Depending on the desired configuration, the processor 704 may be of any type, including but not limited to a microprocessor (µP), a microcontroller (µC), a digital signal processor (DSP), or any combination thereof. The processor 704 may include one more levels of caching, such as a level cache memory 712, one or more processor cores 714, and registers 716. The one, or more processor cores 714 may (each) include an arithmetic logic unit (ALU), a floating point unit (FPU), a digital signal processing core (DSP Core), or any combination thereof. An example memory controller 718 may also be used with the processor 704, or in some implementations, the example memory controller 715 may be an internal part of the processor 704.

Depending on the desired configuration, the system memory 706 may be of any type including but not limited to volatile memory (such as RAM), non-volatile memory (such as ROM, flash memory, etc.), or any combination thereof. The system memory 706 may include an operating system 720, a hosted (cloud based) service 722, and program data 624. The hosted service 722 may include an orchestration module 726, which may perform various tasks in updating the hosted service without disruption to end users. Program data 724 may include, among others, object and update status data 728 associated with updating of deployed code.

The computing device 700 may have additional features or functionality, and additional interfaces to facilitate communications between the example basic configuration 702 and any desired devices and interfaces. For example, a bus/interface controller 730 may be used to facilitate communications between the example basic configuration 702 and one or more data storage devices 732 via a storage interface bus 734. The data storage devices 732 may be one or more removable storage devices 736, one or more non-removable storage devices 738, or a combination thereof. Examples of the removable storage and the non removable storage devices may include magnetic disk devices, such as flexible disk drives and hard-disk drives (HDD), optical disk drives such as compact disk (CD) drives or digital versatile disk (DVD) drives, solid state drives (SSDs), and tape drives, to name a few. Example computer storage media may include volatile and nonvolatile, removable, and non-removable media implemented in any method or technology for storage of information, such as computer-readable instructions, data structures, program modules, or other data.

The system memory 706, the removable storage devices 736 and the non-removable storage devices 738 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 700. Any such computer storage media may be part of the computing device 700.

The computing device 700 may also include an interface bus 740 for facilitating communication from various interface devices (for example, one or more output devices 742, one or more peripheral interfaces 744, and one or more communication devices 746) to the example basic configuration 702 via the bus/interface controller 730. Some of the one or more output devices 742 include a graphics processing unit 748 and an audio processing unit 750, which may be configured to communicate to various external devices such as a display or speakers via one or more A/V ports 752. The one or more peripheral interfaces 744 may include a serial interface controller 754 or a parallel interface controller 756, which may be configured to communicate with external devices such as input devices (for example, keyboard, mouse, pen, voice input device, touch input device, etc.) or other peripheral devices (for example, printer, scanner, etc.) via one or more I/O ports 758. An example communication device 766 includes a network controller 760, which may be arranged to facilitate communications with one or more other computing devices 762 over a network communication link via one or more communication ports 764. The one or more other computing devices 762 may include servers, computing devices, and comparable devices.

The network communication link may be one example of a communication media. Communication media may typically be embodied by computer readable instructions, data structures, program, modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media.

The computing device 700 may be implemented as a part of a general purpose or specialized server, mainframe, or similar computer, which includes any of the above functions. The computing device 700 may also be implemented as a personal computer including both laptop computer and non-laptop computer configurations.

Example embodiments may also include methods for updating a live system with static changes. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 8:
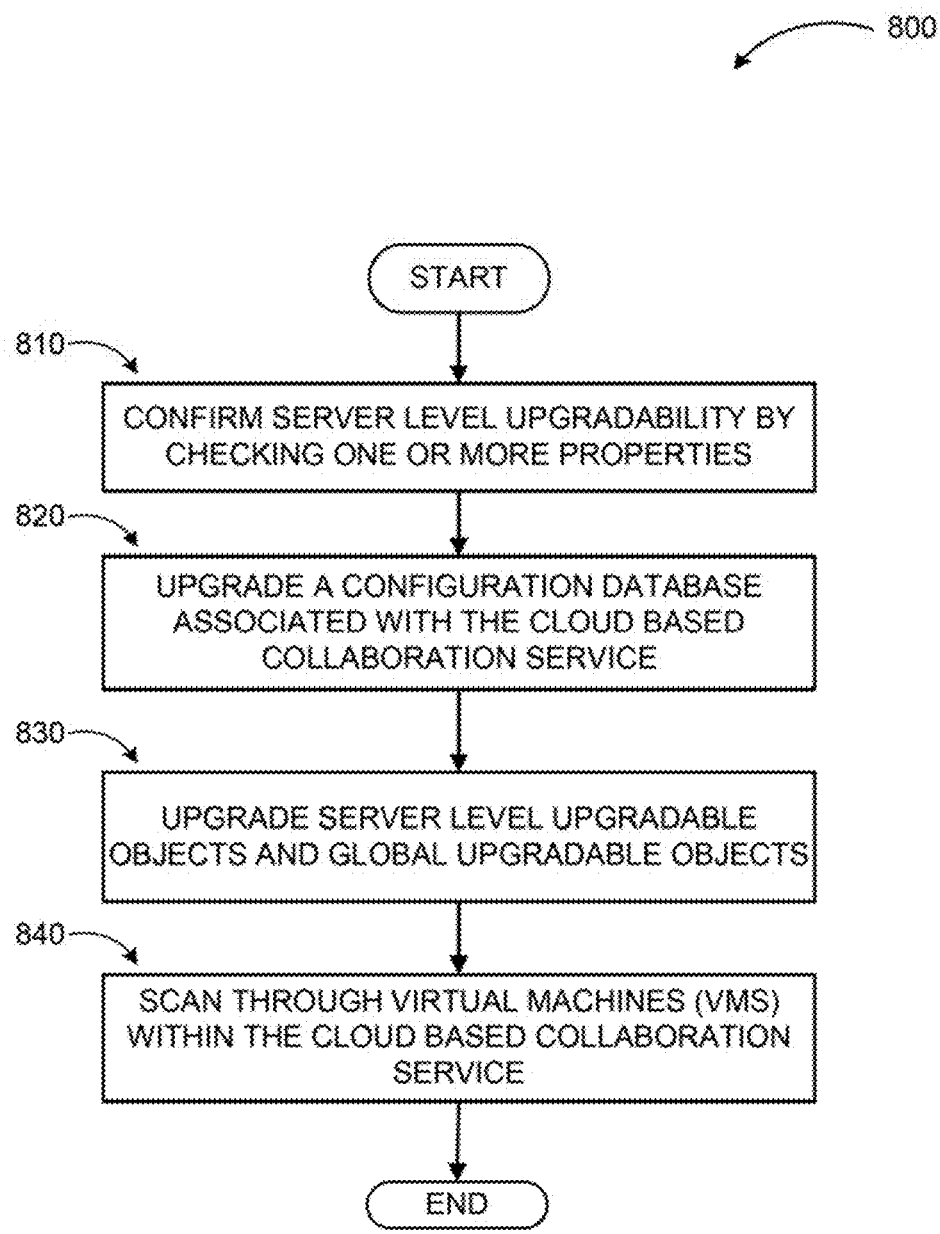
FIG. 8 is a logic flow diagram illustrating a process for updating a live system with static changes, according to embodiments.

FIG. 8 is a logic now diagram illustrating a process for updating a live system with static changes, according to embodiments. A process 800 may be implemented by a cloud based management service, a distributed application, a locally installed application, and/or their components, where the components may be executed on one or more servers or other computing devices.

The process 800 may begin with operation 810, where server level upgradability may be confirmed by checking one or more properties indicating whether a server farm hosting the cloud based collaboration service can upgrade and whether the server farm is backward compatible. At operation 820, a configuration database associated with the cloud based collaboration service may be upgraded. A status of configuration database objects may be set to 'Upgrading' to notify other components of the cloud based collaboration service such that no write operation is allowed on the configuration database until the upgrade is completed.

At operation 830, server level upgradable objects and global upgradable objects may be upgraded by constructing an object tree representing an upgrade hierarchy and upgrading each object according to the upgrade hierarchy. At operation 840, an orchestration module may scan through VMs within the cloud based collaboration service to ensure each VM is upgraded.

The operations included in process 800 are for illustration purposes. Updating a live system with static changes may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to some examples, a means for providing updates to a live system with static changes is described. The means include a means for confirming server level upgradability by checking one or more properties indicating whether a server farm hosting a service can upgrade and whether the server farm is backward compatible; a means for upgrading as configuration database associated with the service, where a status of configuration database objects is set to 'Upgrading' to notify other components of the service such that no write operation is allowed on the configuration database until the upgrade is completed; and a means for upgrading server level upgradable objects and global upgradable objects by constructing an object tree representing an upgrade hierarchy and upgrading each object according to the upgrade hierarchy.

According to some examples, a computing device to provide updates to a live system with static changes is described. The computing may include a memory and a processor coupled to the memory, the processor executing a cloud based service in conjunction with instructions stored in the memory. The cloud based service may include an orchestration module to manage updates to the cloud based service. The orchestration module may be configured to confirm server level upgradability; upgrade a configuration database associated with the cloud based service; and upgrade server level upgradable objects and global upgradable objects such that an online status of a server farm hosting the cloud based service is not changed.

According to other examples, the orchestration module may be further configured to scan through servers within the cloud based service to ensure each server is upgraded. Each server level object and each global object may be assigned a status property. The status property may include 'Running', 'Enabled', 'Disabled', 'Offline', 'Unprovisioning', 'Provisioning', 'Upgrading', or 'Patching'. The orchestration module may be configured to confirm the server level upgradability by checking one or more properties indicating whether the server farm can upgrade and whether the server farm is backward compatible. The orchestration module may be configured to upgrade the configuration database by performing a schema upgrade phase, where configuration database schemas are upgraded for tables and views, performing a stored procedure upgrade phase, where stored procedures are upgraded, and performing a data upgrade phase, where the data in the configuration database is upgraded.

According to further examples, the orchestration module may be configured to upgrade the configuration database by setting a status of configuration database objects to 'Upgrading' to notify other components of the cloud based service such that no write operation is allowed on the configuration database until the upgrade is completed. The computing device may be a management server of a datacenter executing the cloud based service. The computing device may also be a third party upgrade server communicatively coupled to a datacenter executing the cloud based service. The orchestration module may be further configured to detect one or more of new software to install, software to be removed, new register keys to update, and new language packs to install. The orchestration module may be configured to upgrade the server level upgradable objects and the global upgradable objects by constructing an object tree representing an upgrade hierarchy, and upgrading each object according to the upgrade hierarchy.

According to other examples, a method executed at a datacenter server to provide updates to a live system with static changes is described. The method may include confirming server level upgradability by checking one or more properties indicating whether a server farm hosting a service can upgrade and whether the server farm is backward compatible; upgrading a configuration database associated with the service, where a status of configuration database objects is set to 'Upgrading' to notify other components of the service such that no write operation is allowed on the configuration database until the upgrade is completed; and upgrading server level upgradable objects and global upgradable objects by constructing an object tree representing an upgrade hierarchy and upgrading each object according to the upgrade hierarchy.

According to some examples, upgrading the server level upgradable objects may include upgrading a server object, a webservice instance object, a webservice object, a webapplication object, and a website object according to the upgrade hierarchy. The method may also include increasing a granularity of objects at the server level. Upgrading the global upgradable objects may include upgrading a farm object, a service application object, and a service object on a first server in an upgrade flow. Upgrading the server level upgradable objects and the global objects may further include checking a status of each object; determining whether each object is upgradable; determining whether each object needs an upgrade; and determining whether each object is backward compatible.

According to further examples, a computer-readable memory device with instructions stored thereon to provide updates to a cloud based collaboration service with static changes is described. The instructions may include confirming server level upgradability by checking one or more properties indicating whether a server farm hosting the cloud based collaboration service can upgrade and whether the server farm is backward compatible; upgrading a configuration database associated with the cloud based collaboration service, where a status of configuration database objects is set to 'Upgrading' to notify other components of the cloud based collaboration service such that no write operation is allowed on the configuration database until the upgrade is completed; upgrading server level upgradable objects and global upgradable objects by constructing an object tree representing an upgrade hierarchy and upgrading each object according to the upgrade hierarchy; and scanning through virtual machines (VMs) within the cloud based collaboration service to ensure each VM is upgraded.

According to other examples, the instructions may further include employing a GridVM object and a GridFarm object to manage upgrade of the VMs. A property on the GridVM object and the GridFarm object may be used to indicate up to which action the upgrade is run into. The instructions may also include using the property on the GridVM object and the GridFarm object to determine which action to start a subsequent upgrade from.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device to provide updates to a live system with static changes, the computing device comprising:
   a memory;
   a processor coupled to the memory, the processor executing a cloud based service in conjunction with instructions stored in the memory, wherein the cloud based service includes:

an orchestration module to manage updates to the cloud based service, the orchestration module configured to:
confirm server level upgradability by verifying that one or more properties indicate that a server farm hosting the cloud based service is capable of an upgrade and the server farm is backward compatible;
upgrade a configuration database associated with the cloud based service by setting a status of configuration database objects to indicate the upgrade being in progress in order to notify other components of the service such that no write operation is allowed on the configuration database until the upgrade is completed;
construct an object tree that represents an upgrade hierarchy, the object tree comprising a plurality of objects configurable to be marked with an upgrade status, wherein the plurality of objects include one or more of: a server object representing a server in the server farm, a webservice instance object representing an instance of the cloud based service, a webservice object representing the cloud based service, a web application object representing an application within the cloud based service, or a website object representing a website associated with the cloud based service;
determine an object to be upgraded with the object tree, removed from the object tree, or added to the object tree based on the upgrade hierarchy; and
upgrade, remove, or add a component of the cloud based service represented by the object according to the determination.

2. The computing device of claim 1, wherein the orchestration module is further configured to:
scan through servers within the cloud based service to ensure each server is upgraded.

3. The computing device of claim 1, wherein each server object is assigned a status property.

4. The computing device of claim 3, wherein the status property includes one of a plurality of values indicating that the server represented by the server object is running, enabled, disabled, offline, being unprovisioned, being provisioned, or being patched.

5. The computing device of claim 1, wherein the orchestration module is configured to upgrade the configuration database by:
performing a schema upgrade phase, wherein configuration database schemas are upgraded for tables and views,
performing a stored procedure upgrade phase, wherein stored procedures are upgraded, and
performing a data upgrade phase, wherein data in the configuration database is upgraded.

6. The computing device of claim 1, wherein the computing device is a management server of a datacenter executing the cloud based service.

7. The computing device of claim 1, wherein the computing device is a third party upgrade server communicatively coupled to a datacenter executing the cloud based service.

8. A method executed at a datacenter server to provide updates to a live system with static changes, the method comprising:
confirming server level upgradability by verifying that one or more properties indicate that a server farm hosting a service is capable of an upgrade and the server farm is backward compatible;
upgrading a configuration database associated with the service by setting a status of configuration database objects to indicate the upgrade being in progress in order to notify other components of the service such that no write operation is allowed on the configuration database until the upgrade is completed;
constructing an object tree that represents an upgrade hierarchy, the object tree comprising a plurality of objects configurable to be marked with an upgrade status, wherein the plurality of objects includes one or more of: a server object representing a server in the server farm, a webservice instance object representing an instance of a cloud based service, a webservice object representing the cloud based service, a web application object representing an application within the cloud based service, or a website object representing a website associated with the cloud based service;
determine an object to be upgraded with the object tree, removed from the object tree, or added to the object tree based on the upgrade hierarchy; and
upgrading, removing, or adding a component of the cloud based service represented by the object according to the determination.

9. The method of claim 8, further comprising:
increasing a granularity of objects at a server level.

10. The method of claim 8, wherein determining the object to be upgraded with the object tree, removed from the object tree, or added to the object tree comprises:
checking a status of each object;
determining whether each object is upgradable;
determining whether each object needs an upgrade; and
determining whether each object is backward compatible.

11. A computer-readable memory device with instructions stored thereon to provide updates to a cloud based collaboration service with static changes, the instructions comprising:
confirming server level upgradability by verifying that one or more properties indicate that a server farm hosting the cloud based collaboration service is capable of an upgrade and the server farm is backward compatible;
upgrading a configuration database associated with the cloud based collaboration service by setting a status of configuration database objects to indicate the upgrade being in progress in order to notify other components of the cloud based collaboration service such that no write operation is allowed on the configuration database until the upgrade is completed;
constructing an object tree that represents an upgrade hierarchy, the object tree comprising a plurality of objects configurable to be marked with an upgrade status, wherein the plurality of objects includes one or more of: a server level object representing a server in the server farm, a webservice instance object representing an instance of the cloud based collaboration service, a webservice object representing the cloud based collaboration service, a web application object representing an application within the cloud based collaboration service, or a website object representing a website associated with the cloud based collaboration service;
determining an object to be upgraded with the object tree, removed from the object tree, or added to the object tree based on the object tree;

upgrading, removing, or adding a component of the cloud based collaboration service represented by the object according to the determination; and scanning through virtual machines (VMs) within the cloud based collaboration service to ensure each VM is upgraded.

12. The computer-readable memory device of claim 11, wherein the instructions further comprise:

employing a GridVM object and a GridFarm object to manage upgrade of the VMs.

13. The computer-readable memory device of claim 12, wherein a property on the GridVM object and the GridFarm object is used to indicate up to which action the upgrade is run into.

14. The computer-readable memory device of claim 13, wherein the instructions further comprise:

using the property on the GridVM object and the GridFarm object to determine which action to start a subsequent upgrade from.

\* \* \* \* \*